(12) United States Patent
Longe

(10) Patent No.: US 11,780,593 B1
(45) Date of Patent: Oct. 10, 2023

(54) AIRCRAFT CABIN AIR CONDITIONING SYSTEM

(71) Applicant: Greg Longe, Reno, NV (US)

(72) Inventor: Greg Longe, Reno, NV (US)

(73) Assignee: Greg Longe, Reno, NV (US)

( * ) Notice: Subject to any disclaimer, the term of this patent is extended or adjusted under 35 U.S.C. 154(b) by 0 days.

(21) Appl. No.: 17/817,504

(22) Filed: Aug. 4, 2022

(51) Int. Cl.
*B64D 13/08* (2006.01)
*B64D 13/06* (2006.01)

(52) U.S. Cl.
CPC ...... *B64D 13/08* (2013.01); *B64D 2013/0651* (2013.01); *B64D 2013/0688* (2013.01)

(58) Field of Classification Search
CPC ............... B64D 13/06; B64D 13/08; B64D 2013/0651; B64D 2013/0688
USPC .......................................................... 454/71
See application file for complete search history.

(56) References Cited

U.S. PATENT DOCUMENTS

| | | | | |
|---|---|---|---|---|
| 2,391,838 | A * | 12/1945 | Kleinhans ............... | B64D 13/08 454/71 |
| 3,410,191 | A * | 11/1968 | Jackson ................. | A62B 11/00 423/247 |
| 4,419,926 | A * | 12/1983 | Cronin ................... | B64D 13/06 454/74 |
| 6,041,615 | A * | 3/2000 | Ostersetzer ............. | F25B 9/004 62/88 |
| 8,707,721 | B2 | 4/2014 | Scherer et al. | |
| 9,669,936 | B1 * | 6/2017 | Fiterman ................ | B64D 13/06 |
| 10,399,683 | B2 | 9/2019 | Behrens et al. | |
| 11,577,842 | B2 | 2/2023 | Lavergne et al. | |

FOREIGN PATENT DOCUMENTS

| | | | |
|---|---|---|---|
| DE | 102019122963 A1 * | 3/2021 | |
| EP | 3249273 A1 * | 11/2017 | ............. B64D 13/06 |

OTHER PUBLICATIONS

"Displacement Ventilation" (2014 YouTube video); https://video.search.yahoo.com/video/play;_ ylt= AwrgNN03GjxkJjUxML63mWRH;_ylu= c2VjA3NyBHNsawN2aWQEZ3BvcwMzNQ--?p=video+how+does+displacement+ventilation+work+in+HVAC+systems&vid= 50acbea77421488cfbf4a87d6562eced&turl=https%3A%2F%2Ftse2.mm.bing.net%2Fth%3Fid%3DOVP.7IMre4FC_Ww_SogSXqo9agEsDh%26pid%3DApi%26h%3D225%26w%3D300%26c%3D7%26rs%3D1&rurl=https%3A%2F%2Fwww.youtube.com%2Fwatch%3Fv%3DDh9_Za6acAZM&tit=%3Cb%3EDisplacement%3C%2Fb%3E+%3Cb%3EVentilation%3C%4Fb%3E&c=4&sigr=DEUugFjeE98o&sigt=Ra46iuBaxeFs&sigi=tYfgPvVwiiz_fr=p%3As%2Cv%3Av&h=225&w=300&l=1158&age=1398444820&b=31&fr=yfp-hrmob&tt=b.

Liu, Mingxin , et al., "Evaluation of different air distribution systems in a commercial airliner cabin in terms of comfort and COVID-19 infection risk", Building and Environment; vol. 208, Nov. 18, 2021. https://reader.elsevier.com/reader/sd/pii/S0360132321009823?token=4B3D8D11E83A41638916F948463A33CF5201D4FF41164F6B680B445A37CE3887EC959DA54E33D5E3601778CD59950F4E&originRegion=us-east-1&originCreation=20230412200455__;!!K_R5ZAeljLw!.

* cited by examiner

*Primary Examiner* — Allen R. B. Schult
(74) *Attorney, Agent, or Firm* — Perkins Coie LLP; Jordan Becker

(57) ABSTRACT

An aircraft air conditioning system comprises intakes ram air from outside the aircraft, and uses a heat exchanger to pretreat (preheat or precool) some of the ram air. The system further includes a heat recovery unit that uses the cabin exhaust, air to further heat the pretreated ram air, resulting in conditioned ram air. The system further includes an air conditioning pack unit to produce a first conditioned air stream from the conditioned ram air. The system further (Continued)

includes a mixing box to mix the first conditioned air stream with another subflow of ram air to produce a second conditioned air stream.

11 Claims, 1 Drawing Sheet

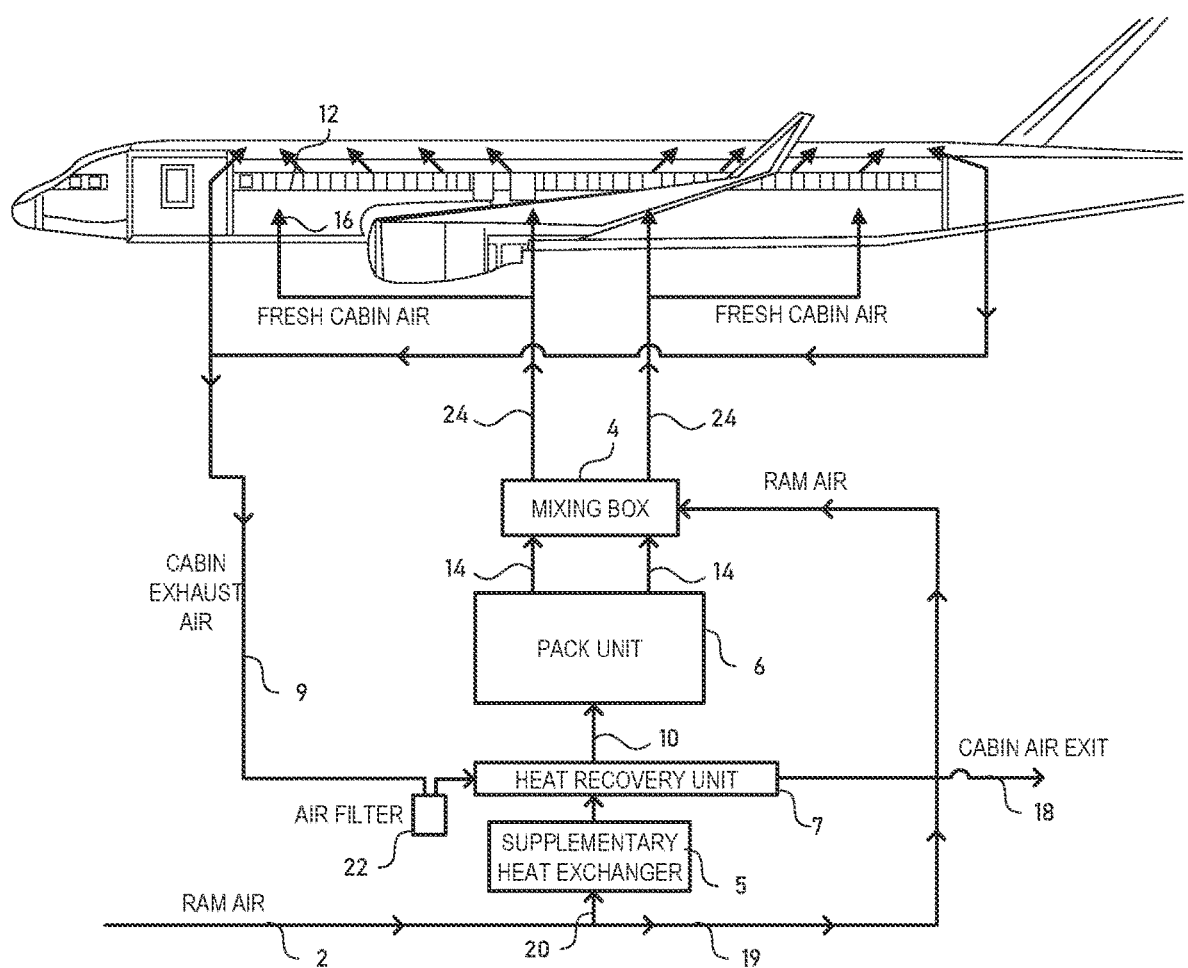

AIRCRAFT CABIN AIR CONDITIONING SYSTEM

TECHNICAL FIELD

The present invention generally pertains to aircraft cabin air conditioning systems.

BACKGROUND

The quality of a traveler's journey on a commercial aircraft often depends on the quality and temperature of the air circulation through the aircraft's cabin. Currently, the air circulation in a commercial aircraft is provided through the use of a heating, ventilation, and air conditioning (HVAC) system that uses a high efficiency particulate air (HEPA) filter. HEPA filters work by recirculating air, such that air is taken from inside the aircraft cabin, circulated. through the HEPA filter, mixed with air from outside the aircraft, and then the mixed air is sent back into the aircraft cabin. The cabin air is then distributed throughout the aircraft cabin primarily by the use of high-velocity jets located over each of the passenger's seats, which can be rotated slightly to adjust the flow direction of the air. The cabin air is then drawn in by exhaust vents on the floor where a portion of the cabin air will be recirculated back into the aircraft's HVAC system.

Currently, aircraft HEPA filtration is expensive and requires continual maintenance. During this maintenance, leaks can be created if the HEPA filter is installed improperly, which can cause unfiltered recirculated air to be distributed throughout the aircraft cabin and sprayed on all of the passengers. Unfiltered air can be dangerous because it, allows contaminants like harmful chemicals and biological pathogens (e.g., viruses, bacteria, and other microorganisms) to be spread around the aircraft cabin, which can make passengers sick. Even if the HEPA filter is installed correctly, airborne contaminants can still be spread throughout the aircraft cabin, because the high-velocity jets used to introduce air into the cabin causes air exhaled by passengers, which may contain pathogens, to be easily spread around the aircraft cabin. In the case of a known contamination event, because of the potential of having unfiltered air distributed around the entire aircraft, the aircraft's cabin may need to be decontaminated before the aircraft's HVAC system can even be opened to be decontaminated.

Additionally, with conventional aircraft HVAC systems today, large amounts of energy are needed to raise or lower the temperature of the air in the aircraft cabin to the desired temperature. Only the incoming outside air is heated or cooled. To reach the desired cabin temperature, the outside air often must be heated or cooled significantly beyond the desired temperature, so that the proper temperature is achieved when the outside air is mixed with the recirculated air. Consequently, heating and cooling do not take place unless the aircraft's engines are running, which can cause the air within the aircraft cabin to reach uncomfortably high temperatures when the aircraft is idle, such as during taxiing, boarding and off-boarding of the aircraft.

BRIEF DESCRIPTION OF THE DRAWING

The FIGURE shows an aircraft HVAC system using heat recovery and reverse airflow distribution.

DETAILED DESCRIPTION

In view of the above-mentioned problems, introduced here is an improved aircraft air conditioning system ("the system") that delivers clean, temperature-controlled air to the aircraft cabin using 100% outside air. The system is an assembly of common components of HVAC system equipment used to heat and cool the occupied spaces of an aircraft cabin with 100% outside air. "Outside air" refers to air that originated from outside of the system (which preferably but is not necessarily outside the aircraft), meaning that the air contains no recirculated air nor air that originated from within the system. Unlike with conventional aircraft HVAC systems, the passengers of the aircraft do not have to breathe used cabin air that includes exhaled human breath and was recirculated throughout the aircraft cabin after being passed through the HVAC system. The outside air can enter the system as hot or cold air either by on-board APU ventilation when the aircraft is stationary or as ram air when the aircraft is in motion, as illustrated in the FIGURE.

With the system introduced here, before the outside air entering the system can be distributed to the passengers, it is heated or cooled to a specified desired temperature and then filtered to remove particulate matter. For example, the specified temperature could be normal room temperature, such as 72 degrees Fahrenheit (F). Because all of the air distributed to the passengers is outside air, large amounts of heating or cooling may he needed before the air reaches a predetermined desirable temperature.

Referring to the FIGURE, the system and process of heating or cooling and filtering the new cabin air starts with ram air entering the system. Note that all the illustrated. components are actually onboard the aircraft. Rain air 2 can enter the aircraft in a variety of different ways, such as through the aircraft's engines and/or through a separate ram air inlet duct or ducts on the aircraft. Once the ram air 2 enters the aircraft it is split into two subfloors, one of which 19 is directed to the mixing box 4 and the other of which 20 is directed to the supplementary heat exchanger 5. The supplementary heat exchanger 5 is used to raise the temperature of the air received from outside the aircraft (cold ram air 2). For example, the supplementary heat exchanger 5 can raise the outside air temperature from negative 30 degrees F. to 5 degrees F. Raising the outside air temperature prevents any water vapor inside the pack unit 6 or heat recovery unit 7 from freezing. Additionally, this process reduces the relative humidity of air in the system, which further lowers the chances of any water vapor freezing inside the system. Ram air 2 that enters the supplementary heat exchanger 5 is then directed into the heat recovery unit 7. The heat recovery unit 7 transfers thermal energy between the cabin exhaust air) 9 and the ram air 2, without mixing them, to turn the ram air into heat-transferred air 10. "Old cabin air" or "cabin exhaust air" refers to air that has been removed from the aircraft cabin through one or more exhaust vents 12.

The cabin exhaust air 9 is old cabin air that will be expelled to an area outside of the system. Depending on the temperature of the cabin exhaust air 9, the heat transferred air 10 can have a higher or lower temperature than the ram air 2. if the cabin exhaust air 9 is at a higher temperature than the ram air 2, then thermal energy is transferred by the heat recovery unit 7 from the cabin exhaust air 9 to the ram air (after being conditioned by the supplementary hear exchanger 5), causing the heat transferred air 10 to exit the heat recovery unit 7 at a temperature higher than that at which the ram air 2 entered. If the cabin exhaust air 9 has a lower temperature than the ram air 1, then thermal energy is transferred by the heat recovery unit 7 from the ram air 2 to the cabin exhaust air 9, causing the heat transferred air 10 to exit the heat recovery unit 7 at a lower temperature than that at which the ram air 2 entered.

The heat recovery unit 7 is an air-to-air heat exchanger that allows the heat transfer process to take place without physical mixing of air, and therefore, without any contamination of the ram air 2 by the cabin exhaust air 9. The cabin exhaust air 9 and ram air 2 are kept physically separate during the heat transfer process. To accomplish this physical separation of airflows, the heat recovery unit 7 can be configured to have two sets of alternating square pipes, one set for the cabin exhaust air 9 and one set for the ram air 1. The sets of pipes can be in close contact with each other and have relatively thin, thermally conductive common walls to allow for a more efficient transfer of heat energy. In at least one embodiment, the cabin exhaust air 9 and ram air 2 pass through alternating conduit pipes in the heat exchanger. The heat recovery unit 7 in at least some implementations recovers about 80% of the thermal energy of the cabin exhaust air 9 and transfers the thermal energy to the ram air 2.

After leaving the heat recovery unit 7, the heat transferred air 10 is provided to the pack unit 6, which converts the heat transferred air 10 into conditioned air 14. The pack unit 6 is an all-in-one heating and cooling package that can raise or lower the temperature of the air that passes through it. A pack unit is a package that is already commonly provided on modern airliners and can be conventional in its composition and configuration. The pack unit 6 can be a conventional pack unit such as found on many modern airlines, and the structure and function of which are well known to those familiar with modern aircraft HVAC systems. The pack unit 6 can also dehumidify the air that passes through it, along with controlling the air pressure inside the aircraft cabin.

"Conditioned air" refers to heat transferred air 10 that has had its temperature increased or decreased by the pack unit 6. Due to the efficiency of the thermal energy transfer in the heat recovery unit 7, the temperature of the heat transferred air 10 only needs to be raised or lowered a few degrees by the pack unit 6 to be suitable for introduction into the aircraft cabin (as fresh cabin air 24) without undermining passenger comfort. For example, outside air entering the system at 110 degrees F. (e.g., while the aircraft is taxiing in a hot geographic location) only needs to be cooled down by an additional 8 degrees F. once it exits the heat recovery unit 7. Additionally, air entering the system at 5 degrees only needs to be heated up by an additional 16 degrees F. once it exits the heat recovery unit 7. This greatly saves on energy costs translating to an overall reduction in the costs to operate the aircraft. The reduction in cost to operate the aircraft means the system can be run at all times and not just when the aircraft's engines are on.

After leaving the pack unit 6, the conditioned air 14 enters the mixing box 4, where a set of controllable dampers (not shown) or other suitable mechanism is used to select and produce the appropriate mixture ratio of ram air 2 to conditioned air 14 to be mixed together to achieve the desired temperature for the cabin fresh air 14. A direct digital control (DDC) computerized system (not shown) can be coupled to the mixing box 14 to control the dampers and select the appropriate mixture ratio to achieve the desired cabin air temperature. A DDC computerized system can control and monitor the system constantly during flight, allowing issues to be diagnosed before the aircraft lands. The DDC can control the temperature by zoning sections throughout the cabin and individually in the flight deck. Zoning allows the DDC to make adjustments in specific zones instead of having to make adjustments that affect the entire aircraft The system then can be monitored and diagnosed immediately using the aircraft's wi-fi system. The air mixture produced by the mixing box 4 then circulates through high-efficiency air filters (not shown), becoming the fresh cabin air 24 that is introduced into the cabin via one or more fresh air supply vents 16. The high-efficiency air filters catch particulate matter, preventing contaminants from entering the heat exchangers, ductwork, and aircraft cabin.

The fresh cabin air 24 is distributed to the passengers at the desired temperature because the system incorporates a process known as displacement ventilation. Displacement ventilation refers to a process by which the air is introduced to a space at or near the floor of the cabin and then exhausted from the space at or near the ceiling of the cabin, which allows the air in a system to be distributed to the occupants of a space at the desired temperature. Conventional aircraft HVAC systems differ because the air is introduced at the ceiling of the cabin at a temperature far above or below the desired temperature and then exhausted at the floor. For example, if the desired temperature of the system is 72 degrees F., displacement ventilation allows the air to be distributed at 72 degrees F., while with conventional HVAC systems the air needs to be distributed at approximately 50 degrees F. for cooling and 110 degrees F. for heating. The technique introduced here, therefore, saves greatly on energy costs because the new cabin air does not have to be greatly heated or cooled beyond the desired temperature, This technique in turn saves on operating costs compared to conventional HVAC systems, allowing the system to be in use while the aircraft is stationary, for example when the aircraft is waiting on the ramp during the loading or unloading of passengers or during the idle time on the runway.

In at least one embodiment, the system introduced here distributes the fresh cabin air 24 into the cabin through floor mounted supply vents 16 in the aircraft cabin, unlike conventional systems that introduce the air from above the passenger's heads. The floor mounted supply vents 16 can be a set of grille covered supply vents located throughout the aircraft cabin's floor that are connected to the outflow from the mixing box and that allow new cabin air to be distributed to the passengers. Because the new cabin air is distributed through displacement ventilation, the system reduces the spread of airborne biological pathogens originating from the passengers, compared to conventional aircraft HVAC systems. The new cabin air can be distributed from the floor vents at a relatively slow speed, such as approximately 200 feet per minute. As the new cabin air enters the aircraft cabin, stratification begins to occur. "Stratification" is the process by which the cooler and therefore more dense new cabin air sinks to or stays at the bottom of the aircraft. As the new cabin air interacts with the passengers it slowly heats up and therefore becomes less dense than the other air in the aircraft cabin. This causes the warmer new cabin air to rise to the ceiling of the aircraft cabin and become cabin exhaust air, where overhead exhaust vents 12 can then draw the cabin exhaust air out of the cabin. Overhead exhaust vents 12 can be provided as a set of grille covered vents located throughout the aircraft cabin's ceiling that are used to draw cabin exhaust air out of the system so it can be replaced by new cabin air. The stratification process allows for a constant flow of new cabin air entering aircraft cabin while the cabin exhaust air is drawn away from the passengers.

The constant flow of air from beneath the passengers inhibits the spread of contaminants (e.g., airborne viruses and bacteria) throughout the aircraft cabin that could otherwise make passengers sick. The constant flow prevents contaminants from being spread because the stratification process causes the less dense warmer air to rise to the ceiling of the cabin in a heat plume, potentially at a rate of 400 feet per minute. The heat plume can catch air from passengers' exhalations that may contain contaminants. The heat plume forces the exhaled air upwards towards the overhead exhaust vents where it can ultimately be exhausted with the cabin exhaust air. Additionally, a clear solid (e.g., plexiglass) screen on the back of each passenger's seat can be added to protect other passengers from exhaled air and help push the exhaled air towards the forward and rearward exhaust vents. Also, because the lower energy costs allow the system to run when the aircraft is stationary, there is no point in the travel process where the passengers are at an increased risk of being exposed to contaminants because, unlike conventional systems, the system introduced here can be in constant operation from the moment the passengers enter the aircraft to the time that they exit the aircraft.

To prevent the cabin exhaust air from possibly contaminating the other air in the system or the outside air, the cabin exhaust air 9 can be passed through one or more filters 22 after it enters the overhead exhaust vents. After leaving the air filter(s) the cabin exhaust air 9 then travels to the heat recovery unit 7, where it either heats or cools the entering ram air 2 using heat energy transfer. Once the heat energy is transferred, the cabin exhaust air exits the system through the cabin air exhaust 18.

The system can be maintained easily and inexpensively, because it does not require the constant cleaning, disposal of contaminated materials and replacing of HEPA air filters. Additionally, decontamination of the aircraft cabin is not required in the case of known contamination by biological pathogens because all air is exhausted after the air passes through the system and is not recirculated back into the system.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. An aircraft air conditioning system comprising:
    a cabin exhaust conduit system coupled to a plurality of exhaust vents located in a passenger cabin of the aircraft to remove cabin exhaust air from the passenger cabin, wherein the plurality of exhaust vents are located at a plurality of respective positions above a passenger position;
    a ram air intake to intake ram air from outside the aircraft;
    a heat exchanger coupled to receive a first subflow of the ram air and configured to preheat or precool the first subflow of ram air to produced pretreated ram air;
    a heat recovery unit to receive the cabin exhaust air from the passenger cabin via the cabin exhaust conduit system and to receive the pretreated ram air, the heat recovery unit configured to use the cabin exhaust air to further heat the pretreated ram air and to output conditioned ram air;
    an air conditioning pack unit to receive the conditioned ram air from the heat recovery unit and to provide further temperature conditioning of the conditioned ram air, to produce a first conditioned air stream;
    a mixing box to receive the first conditioned air stream from the pack unit and to receive a second subflow of the ram air, wherein the mixing box is configured to mix the first conditioned air stream with the second subflow of the ram air to produce a second conditioned air stream, wherein the mixing box comprises a set of controllable dampers to select a mixture ratio of the first conditioned air stream and the second subflow of ram air; and
    a cabin fresh air conduit system to convey the second conditioned air stream to a plurality of supply vents located in the passenger cabin to inject the second conditioned air stream into the passenger cabin, wherein the second conditioned air stream consists of only fresh air, the plurality of supply vents are located at a plurality of respective positions substantially below the passenger position, and the aircraft air conditioning system is configured to introduce fresh air into the passenger cabin via the plurality of supply vents at a rate of approximately 200 feet per minute and to remove air from the passenger cabin via the plurality of exhaust vents at a rate in the range of approximately 200 feet per minute to approximately 400 feet per minute such that stratification occurs within the passenger cabin.

2. The aircraft air conditioning system of claim 1, wherein the heat exchanger is configured to preheat the ram air from −30 degrees F. to 5 degrees F.

3. The aircraft air conditioning system of claim 1, wherein the heat recovery unit transfers thermal energy between the cabin exhaust air and the heated ram air without mixing the cabin exhaust air and the heated ram air.

4. An aircraft air conditioning system comprising:
    a first conduit system coupled to a plurality of exhaust vents located on or in proximity to an overhead bulkhead of a passenger cabin of the aircraft, to remove cabin exhaust air from the passenger cabin;
    a ram air intake to intake ram air from outside the aircraft while the aircraft is in flight;
    a heat exchanger coupled to receive a first subflow of the ram air and configured to preheat the first subflow of ram air to produced preheated ram air;
    a heat recovery unit to receive the cabin exhaust air from the passenger cabin via the first conduit system and to receive the preheated ram air from the heat exchanger, the heat recovery unit configured to use the cabin exhaust air to further heat the preheated ram air and to output conditioned ram air;
    an air conditioning pack unit to receive the conditioned ram air from the heat recovery unit and to provide further temperature conditioning of the conditioned ram air by heat exchange, to produce a first conditioned air stream;
    a mixing box to receive the first conditioned air stream from the pack unit and to receive a second subflow of the ram air, wherein the second subflow of the ram air is untreated ram air, the mixing box being configured to mix the first conditioned air stream with the second subflow of ram air to produce a second conditioned air stream, wherein the mixing box comprises a set of controllable dampers to select a mixture ratio of the first conditioned air stream and the second subflow of ram air; and
    a second conduit system to convey the second conditioned air stream to a plurality of supply vents located below the exhaust vents, to inject the second conditioned air stream into the passenger cabin, wherein the aircraft air conditioning system is configured to introduce only fresh air into the passenger cabin via the plurality of supply vents at a rate of approximately 200 feet per minute and to remove air from the passenger cabin via the plurality of exhaust vents at a rate in the range of approximately 200 feet per minute to approximately 400 feet per minute such that stratification occurs within the passenger cabin.

5. The aircraft air conditioning system of claim 4, wherein the heat exchanger is configured to preheat the ram air from −30 degrees F. to 5 degrees F.

6. The aircraft air conditioning system of claim 4, wherein the heat recovery unit transfers thermal energy between the cabin exhaust air and the heated ram air without mixing the cabin exhaust air and the heated ram air.

7. An aircraft air conditioning system comprising:
a cabin exhaust conduit system coupled to a plurality of exhaust vents located in a passenger cabin of the aircraft so as to remove cabin exhaust air from the passenger cabin from a position above a passenger position;
a cabin fresh air conduit system to convey fresh air to a plurality of supply vents located in the passenger cabin so as to inject the fresh air into the passenger cabin at a position substantially below the passenger position;
a ram air intake to intake ram air from outside the aircraft;
an air conditioning pack unit to receive conditioned ram air and to provide temperature conditioning of the conditioned ram air by heat exchange, to produce a first conditioned air stream; and
thermal preconditioning means for using the cabin exhaust air to preheat or precool the ram air from outside the aircraft so as to produce the conditioned ram air, wherein the thermal preconditioning means receives a first subflow of untreated ram air at a first input point that is upstream from the air conditioning pack unit and receives a second subflow of untreated ram air at a second input point that is downstream from the air conditioning pack unit, and wherein the aircraft air conditioning system is configured to introduce only fresh air into the passenger cabin via the plurality of supply vents at a rate of approximately 200 feet per minute and to remove air from the passenger cabin via the plurality of exhaust vents at a rate in the range of approximately 200 feet per minute to approximately 400 feet per minute such that stratification occurs within the passenger cabin; and
a mixing box to receive the first conditioned air stream from the pack unit and to receive the second subflow of the ram air from outside the aircraft, the mixing box being configured to mix the first conditioned air stream with the second subflow of the ram air to produce a second conditioned air stream, wherein the mixing box comprises a set of controllable dampers to select a mixture ratio of the first conditioned air stream and the second subflow of the ram air.

8. The aircraft air conditioning system of claim 7, wherein the thermal preconditioning means comprises a heat recovery unit to receive the cabin exhaust air from the passenger cabin via the first conduit system, the heat recovery unit configured to use the cabin exhaust air to heat a first subflow of the ram air and to output conditioned ram air to the pack unit.

9. The aircraft air conditioning system of claim 8, wherein the heat recovery unit transfers thermal energy between the cabin exhaust air and the ram air without mixing the cabin exhaust air and the ram air.

10. The aircraft air conditioning system of claim 8, wherein the thermal preconditioning means further comprises a heat exchanger coupled to receive the first subflow of the ram air and configured to preheat or precool the subflow of ram air to produced pretreated ram air.

11. The aircraft air conditioning system of claim 10, wherein the heat exchanger is configured preheat the ram air from −30 degrees F. to 5 degrees F.

* * * * *